Sept. 23, 1952    E. M. PATTERSON ET AL    2,611,621
TOOLHOLDER
Filed Sept. 20, 1950    2 SHEETS—SHEET 1
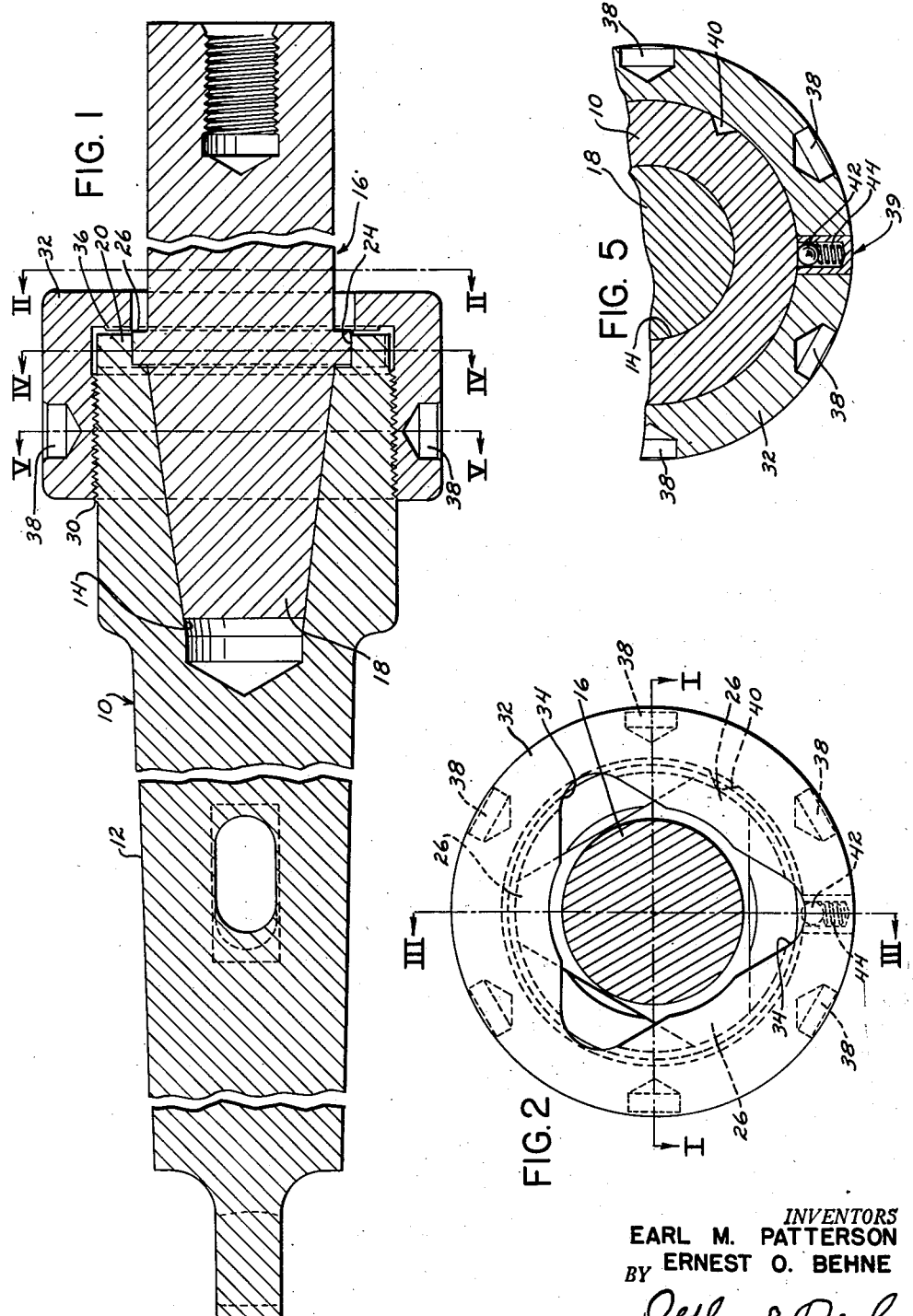
INVENTORS
EARL M. PATTERSON &
BY ERNEST O. BEHNE
*Oldham & Oldham*
ATTORNEYS Sept. 23, 1952  E. M. PATTERSON ET AL  2,611,621
TOOLHOLDER
Filed Sept. 20, 1950  2 SHEETS—SHEET 2
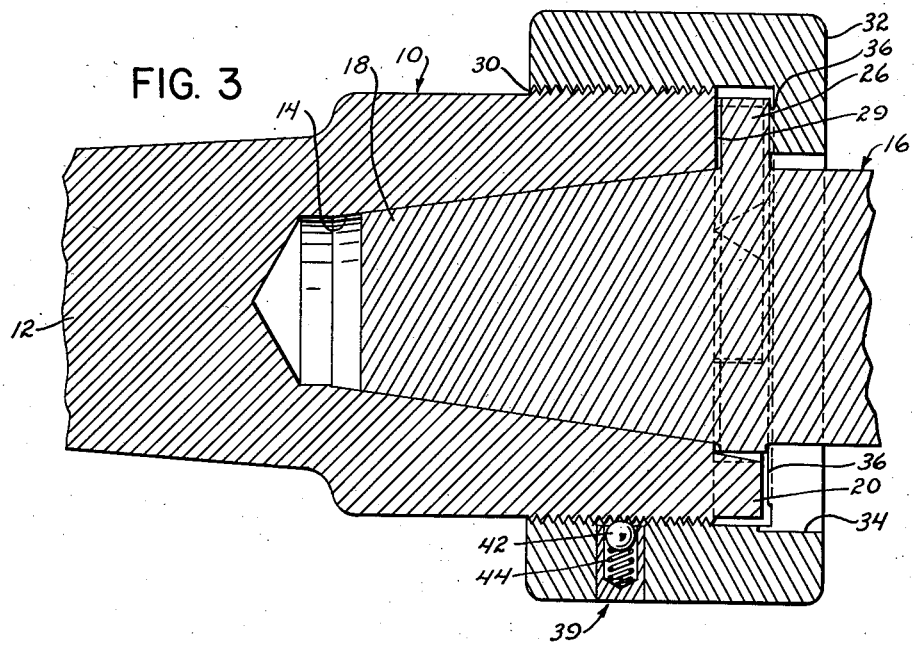
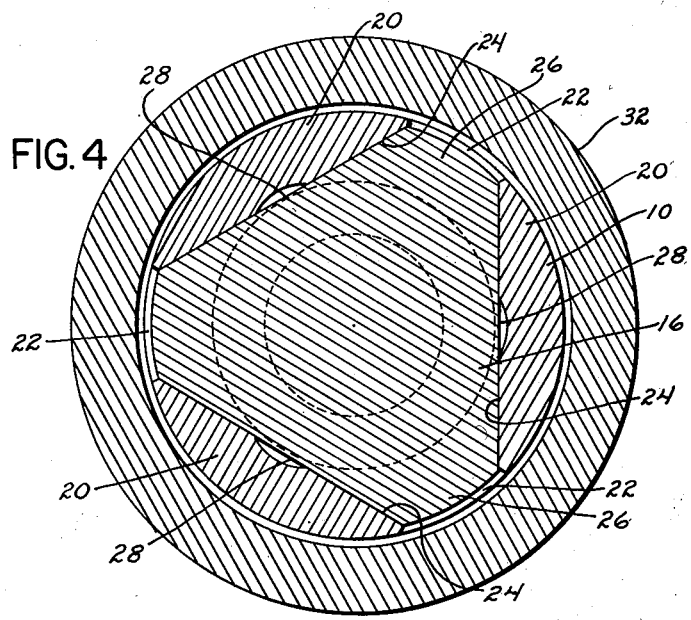
INVENTORS
EARL M. PATTERSON &
BY ERNEST O. BEHNE
Oldham & Oldham
ATTORNEYS Patented Sept. 23, 1952

2,611,621

UNITED STATES PATENT OFFICE 2,611,621

TOOLHOLDER

Earl M. Patterson and Ernest O. Behne, Akron, Ohio, assignors to The Portage Machine Co., Akron, Ohio, a corporation of Ohio Application September 20, 1950, Serial No. 185,854

8 Claims. (Cl. 279—91)

1

This invention relates to tool holders, and, more particularly, to a quick change holder for securely mounting a tool cutter or the like in operative position on a machine such as a lathe, drill press, milling machine, or the like.

Heretofore, a number of different tool holders have been proposed for use in machine tools, whereby cutters or other tools may be readily interchanged. The most common method of centering and securing a tool in position is the tapered socket and shank arrangement which depends entirely upon frictional engagement between shank and socket for retaining the tool and transmitting force to the cutter. Such a coupling is open to the objections that it is difficult to disengage the tool shank from the socket, and any dirt or other foreign matter getting between the tapered surfaces materially reduces the frictional engagement thereof, and may allow the cutter to slip or fall out. Any slippage may result in a galled surface which further reduces the effectiveness of the frictional coupling.

Other arrangements that have been advanced in the prior art include types of threaded couplings, bayonet locks, or taper shanks with associated means for breaking the frictional bond between the surfaces of the shank and the socket. None of these arrangements have been universally adopted because they are either too expensive to make or are not strong and rugged enough to run true under the loading forces to which cutting tools are subjected, or are too complicated and time-consuming in operation.

It is the general object of this invention to avoid and overcome the foregoing and other difficulties of and objections to prior art practices by the provision of a rugged tool holder which provides a positive coupling for transmitting rotational force to the tool thereby secured and which is inexpensive to manufacture and maintain and quick and simple to operate.

Another object of the invention is the provision of a tool holder with a coupling that can be quickly and easily disconnected to effect the exchange of tools, yet will accurately secure the tool for rotational movement so that the cutter will run true.

The aforesaid objects of the invention, and other objects which will become apparent as the description proceeds, are achieved by providing a tool holder assembly including an adapter having a tapered shank at one end and adapted to be rotatively secured to a machine tool, such as a lathe, milling machine, horizontal and vertical boring mill, drill press, or the like, the

2 adapter having a tapered socket at its other end, a cutter tool having a tapered shank mating with the socket and adapted to be slightly received in the socket, lugs spaced, for example, 120 degrees apart on the end of the adapter, lugs on the cutter tool shank for engaging down between the lugs on the adapter, a cap nut threadably engaged on the end of the adapter, the cap of the nut having a triangular opening, said cap engaging the lugs on the cutter tool shank, whereby the shank is held securely in the socket.

For a better understanding of the invention, reference should be had to the accompanying drawings, wherein Fig. 1 is a longitudinal cross-sectional view of one embodiment of the invention illustrating the complete tool holder assembly;

Fig. 2 is a transverse cross-sectional view taken substantially on line II—II in Fig. 1 and showing particularly the cap nut in locking position;

Fig. 3 is an enlarged fragmentary cross-sectional view taken substantially on line III—III in Fig. 2;

Fig. 4 is an enlarged transverse sectional view taken substantially on line IV—IV of Fig. 1 and illustrating particularly the engagement of the nut.

Fig. 5 is a fragmentary transverse cross-sectional view taken substantially on line V—V of Fig. 1 and showing details of the ball detent and indexing notch.

With specific reference to the form of the invention illustrated in the drawings, the numeral 10 indicates generally an adapter having a tapered shank 12 of standard taper (for example, Morse #6) for securing it in conventional manner to a lathe, horizontal and vertical boring mill, drill press, or other machine tool on which it is to be used. Axially located at the opposite end of the adapter from the tapered shank 12 is a tapered socket 14.

Indicated generally at 16 is a tool particularly illustrated as a boring bar. However, it is to be understood that this tool can take a variety of forms such as a milling cutter, milling arbor, drill, tap, etc. The tool 16 has a tapered shank 18 mating with the socket 14 and slidably received therein. The engaging taper between the socket 14 and the shank 18 is of the order of 3½ inches to the foot, so that, although the aligning action is excellent, the wedging action is slight, thus facilitating disengagement of the tool from the adapter.

On the end of the adapter 10 adjacent to the socket 14 are projecting lugs 20. These are preferably three in number, and are spaced 120 degrees apart. The upstanding lugs 20 are formed by machining a recess 22 in the end of the adapter which is substantially triangular in shape, as shown in Fig. 4. The lugs 20 are each formed with a flat face 24 parallel to the axis of the adapter.

The tool 16, in whatever form it might take, is provided with a flange 26. This flange has three flat faces 28 milled at 120 degrees from each other, giving the flange 26 a substantially triangular shape of such size that it will fit snugly into the triangularly shaped recess 22 on the end of the adapter 10, thereby engaging the three lugs 20 so as to secure the tool 16 against relative rotational movement with the adapter 10. When the shank 18 of the tool 16 is inserted into socket 14 of the adapter 10, the vertical faces 24 of the lugs 20 engage the corresponding faces 28 of the flange 26. Flange 26 is so positioned on the tool 16 that, when the shank 18 and socket 14 are in engagement, the flange is spaced from the bottom of the recess $22\frac{1}{64}''$ to $\frac{1}{32}''$, as best shown in Fig. 3, the spacing being designated by the numeral 29. This is to insure that the flange won't bottom and prevent the shank 18 and socket 14 from coming into complete engagement.

The outer periphery of the adapter 10 is machine threaded at 30 to engage a cap nut 32. The cap of the nut 32 is provided with a substantially triangular hole 34 just slightly larger than the flange 26 so that, when the flange is properly oriented, it passes freely therethrough. The inner surface of the cap of the nut 32 is provided with a boss 36 along each side of the hole 34 which engages the outer face of the flange 26 when the cap nut 32 is screwed down in position. The surface of the boss 36 is ground off after the threads 30 are cut so that the boss will engage the flange 26 in locking position when the triangular hole 34 is rotated through approximately 60 degrees from the position of alignment with the flange 26. The cap nut has a plurality of holes 38 by which a spanner wrench can engage the nut to loosen or tighten it.

It is desirable to have some means of aligning the cap nut 32 relative to the adapter 10 so that the tool 16 can be withdrawn through the triangular hole 34 without the necessity of looking through the hole 34 to tell when it is aligned with the flange 26. To this end, a spring loaded detent shown generally at 39 is provided. A notch 40 on the adapter 10 is so positioned that it engages the ball 42 under the pressure of spring 44 when the hole 34 is in such alignment with the adapter 10 that the flange 26, together with the tool 16, can be withdrawn.

Even though it is believed that the operation of the apparatus will be apparent from the foregoing description, a brief review thereof will now be made for purposes of summary and simplification. In particular, the adapter 10 is secured to the machine tool in the usual manner by means of the tapered shank 12. The cap nut 32 is screwed onto the adapter within a fraction of a turn of locking position, where the ball detent 39 on the cap nut engages the notch 40 in the adapter. This brings the hole 34 in the cap nut into alignment with the recess 22. The shank 18 of the tool 16 is then inserted into the socket 14 by orienting the flange 26 so that it passes through the hole 34 in the cap nut 32. The cap nut 32 is then tightened down in known fashion by means of a spanner wrench which engages one of the holes 38. In turning the cap nut, the boss 36 engages the outer face of the flange 26, thereby securely clamping the shank 18 in the socket 14. To remove the tool 16, it is merely necessary to loosen the cap nut 32 through a fraction of a turn until the detent 39 engages the notch 40, whereby the hole 34 properly aligns itself with the triangular flange 26 so that the tool may be withdrawn from the socket 14.

It will be recognized that the objects of the invention have been achieved by the provision of a tool holder assembly which is particularly rugged in its construction and yet easy to operate and inexpensive to manufacture. The assembly provides a coupling between a tool and the machine driving the tool which affords a quick disconnect without sacrificing rotational or bending strength, and which provides excellent alignment.

While in accordance with the patent statutes, one best known embodiment of the invention has been illustrated and described in detail, it is to be particularly understood that the invention is not limited thereto or thereby, but that the inventive scope is defined in the appended claims.

We claim:

1. A quick disconnect coupling between two rotating members for machine tools or the like including an adapter having a standard taper shank at one end and a tapered socket at the opposite end, three lugs projecting from the end of the adapter adjacent said socket, said lugs forming a substantially triangular recess having three flat faces parallel to the axis of rotation of said socket and spaced 120° apart, a tapered shank member slidably engaging said tapered socket, a substantially triangular flange integrally formed on said shank member, said flange snugly fitting in said recess when the tapered shank member and socket are in engagement, a cap nut threadably engaging the adapter, the cap portion of said cap nut having a substantially triangular hole through which the shank and flange of said tapered shank member can pass, said cap nut securing the shank member in the socket of the adapter by engagement of the inner face of the cap nut with the flange when rotated into locking position, and detent means associated with said cap nut and adapter for indicating alignment of said triangular hole with said triangular flange for withdrawal of said shank member.

2. A quick disconnect coupling between two rotating members for machine tools or the like including an adapter having a standard taper shank at one end and a tapered socket at the opposite end, three lugs projecting from the end of the adapter adjacent said socket, said lugs forming a substantially triangular recess having three flat faces parallel to the axis of rotation of said socket and spaced 120° apart, a tapered shank member slidably engaging said tapered socket, a substantially triangular flange integrally formed on said shank member, said flange snugly fitting in said recess when the tapered shank member and socket are in engagement, a cap nut threadably engaging the adapter, the cap portion of said cap nut having a substantially triangular hole through which the shank and flange of said tapered shank member can pass, and said cap nut securing the shank member in the socket of the adapter by engagement of the inner face of the cap nut with the flange when rotated into locking position.

3. A quick disconnect coupling between two rotating members for machine tools or the like including an adapter having a standard taper shank at one end and a socket at the opposite end, three lugs projecting from the end of the adapter adjacent said socket, said lugs forming a substantially triangular recess having three flat faces parallel to the axis of rotation of said socket and spaced 120° apart, a shank member slidably engaging said socket, a substantially triangular flange integrally formed on said shank member, said flange snugly fitting in said recess when the shank member and socket are in engagement, a cap nut threadably engaging the adapter, the cap portion of said cap nut having a substantially triangular hole through which the shank and flange of said tapered shank member can slidably pass, and said cap nut securing the shank member in the socket of the adapter by engagement of the inner face of the cap nut with the flange when rotated into locking position.

4. A quick disconnect coupling between two rotating members for machine tools or the like including an adapter having a standard taper shank at one end and a tapered socket at the opposite end, a tapered shank member slidably engaging said tapered socket, a flange integrally formed on said shank member, said flange having a non-circular periphery, lugs projecting from the end of the adapter engaging the periphery of said flange to prevent rotational movement between the adapter and shank member when the tapered shank member and socket are in engagement, a cap nut threadably engaging the adapter, the cap portion of said cap nut having a hole therethrough, the hole in said cap nut being the same shape as the flange of said tapered shank member so that the shank and flange can slidably pass through, and said cap nut securing the shank member in the socket of the adapter by engagement of the inner face of the cap nut with the flange when rotated into locking position.

5. A quick disconnect coupling between two rotating members for machine tools or the like including an adapter having a standard taper shank at one end and a tapered socket at the opposite end, a plurality of lugs projecting from the end of the adapter adjacent said socket, said lugs forming a plurality of interspaced recesses, a tapered shank member slidably engaging said tapered socket, a plurality of lugs integrally formed on said shank member snugly engaging said recesses when the tapered shank and socket are in engagement, a cap nut threadably engaging the adapter, the cap portion of said cap nut having a substantially triangular hole through which the shank and associated lugs of said tapered shank member can slidably pass, and said cap nut securing the shank member in the socket of the adapter by engagement of the inner face of the cap nut with the lugs when rotated through an arc into locking position, said tapered shank member being removable from said tapered socket through the hole in said cap nut when rotated through an arc to its unlocked position.

6. In a tool holder assembly, an adapter having a tapered shank at one end and adapted to be rotatably secured to a machine tool, the adapter having a tapered socket at its other end, a cutter tool having a tapered shank mating with said socket and adapted to be slidably received in said socket, lugs spaced 120° apart on the end of the adapter, lugs on the cutter tool shank for engaging the lugs on the adapter, a cap nut threadably engaging the end of said adapter, the cap of the nut having a triangular opening through which the cutter tool shank and lugs can slidably pass, said cap nut having a locked and an unlocked position with relation to the cutter tool shank and the lugs thereon which positions are separated by less than 360° of rotation of said cap nut, said cap engaging the lugs on the cutter tool shank when rotated into locking position, whereby the tapered shank is held securely in the socket.

7. A quick disconnect tool holder including a holder member, a tool member adapted to stab into the holder member, interlocking means carried by the members and holding the tool member against rotation relative to the holder member, rotary means mounted on the holder member through which the tool member and its interlocking means can move axially and gripping portions associated with the rotary means for engaging the interlocking means of the tool member upon rotation of the rotary means to hold the tool member axially in the holder member.

8. A tool holder as in claim 7 wherein said gripping portions protrude axially inwardly an adjustable amount from said rotary means.

EARL M. PATTERSON.
ERNEST O. BEHNE.

REFERENCES CITED

The following references are of record in the file of this patent:

UNITED STATES PATENTS

| Number | Name | Date |
| --- | --- | --- |
| 1,041,338 | Palmgren | Oct. 15, 1912 |
| 1,502,528 | Reulback | July 22, 1924 |
| 1,618,998 | Redinger | Mar. 1, 1927 |
| 2,039,855 | Stone | May 5, 1936 |
| 2,212,406 | Rusnak | Aug. 20, 1940 |
| 2,301,981 | Steffens | Nov. 17, 1942 |
| 2,449,887 | Edel et al. | Sept. 21, 1948 |
| 2,511,416 | Rundorff | June 13, 1950 |